March 31, 1959  N. T. BALDANZA  2,879,614
ULTRAVIOLET LIGHT ILLUMINATED SIGN AND DISPLAY DEVICES
Filed May 20, 1954  2 Sheets-Sheet 1
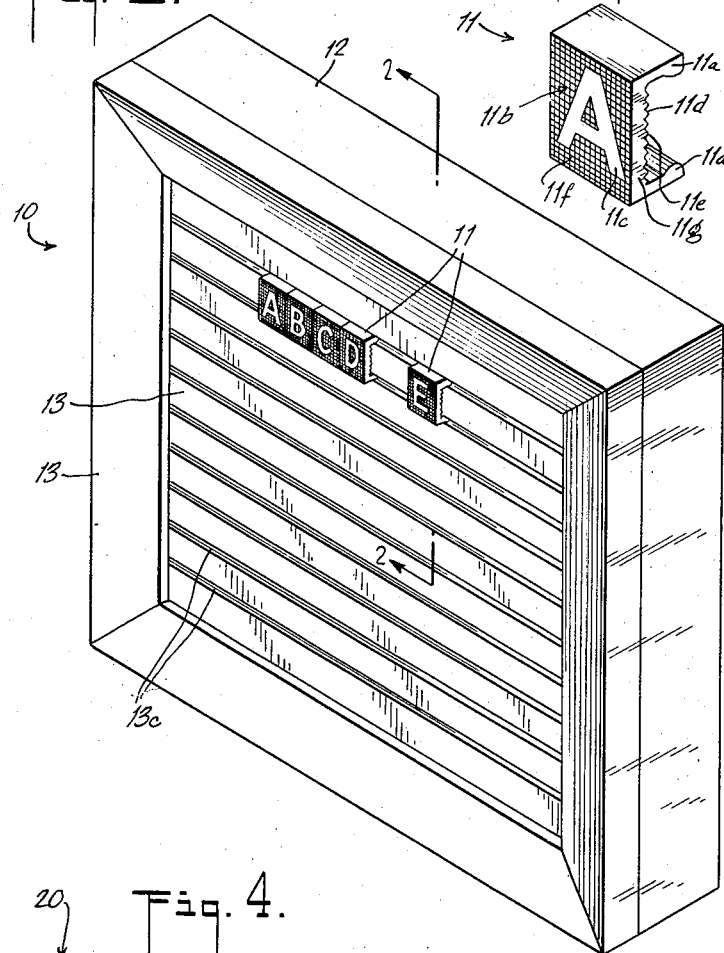
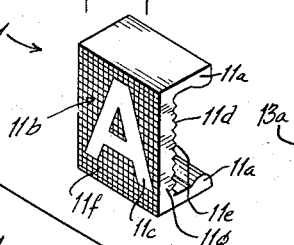
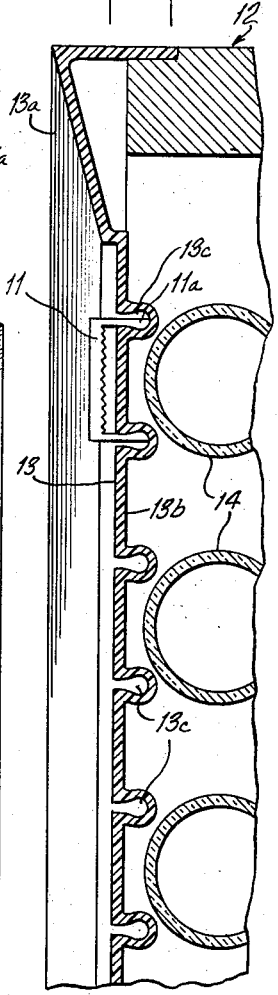
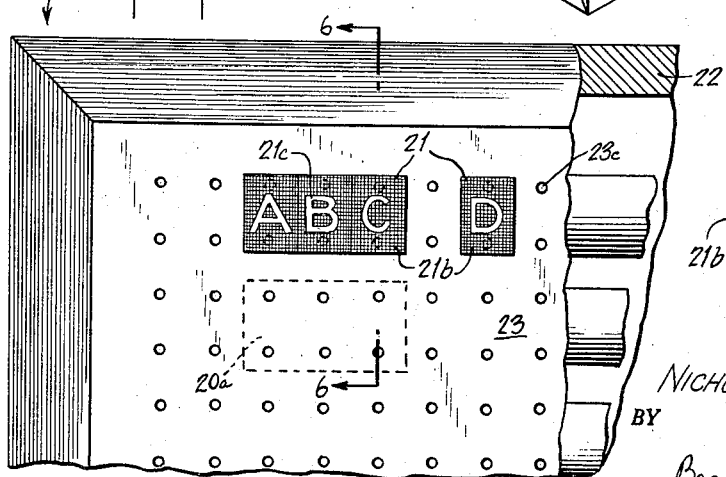
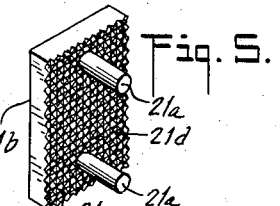
INVENTOR.
NICHOLAS T. BALDANZA
BY
Barnett & Barnett
ATTORNEYS March 31, 1959     N. T. BALDANZA     2,879,614
ULTRAVIOLET LIGHT ILLUMINATED SIGN AND DISPLAY DEVICES
Filed May 20, 1954     2 Sheets-Sheet 2
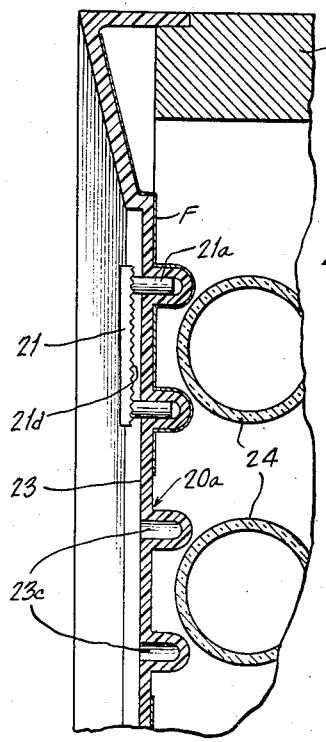
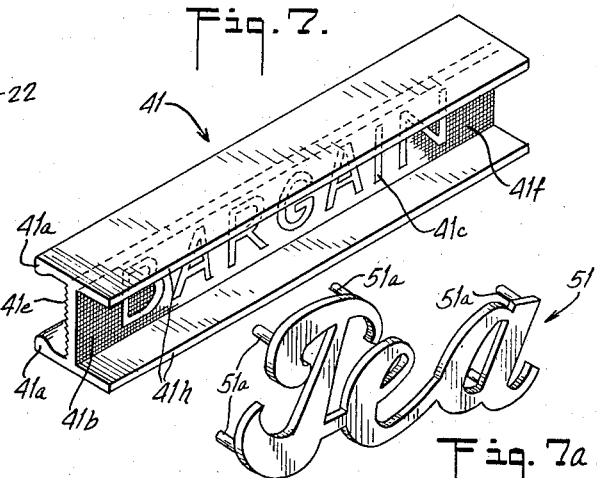
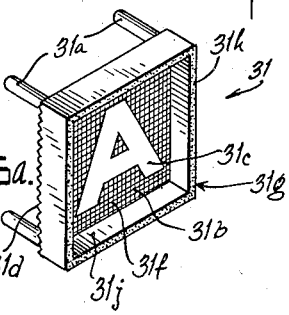
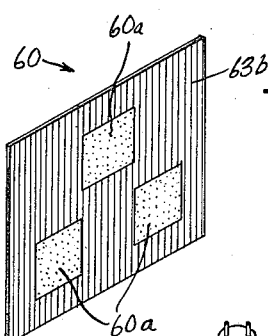
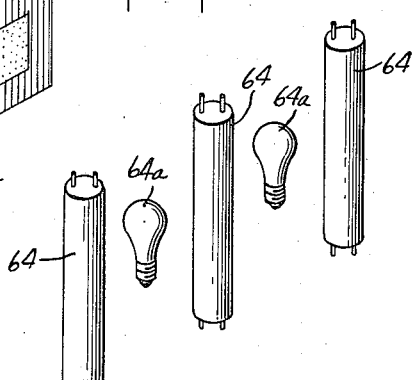
INVENTOR.
NICHOLAS T. BALDANZA
BY
Barnett & Barnett
ATTORNEYS

United States Patent Office 2,879,614
Patented Mar. 31, 1959

2,879,614

ULTRAVIOLET LIGHT ILLUMINATED SIGN AND DISPLAY DEVICES

Nicholas T. Baldanza, Rutherford, N.J.

Application May 20, 1954, Serial No. 431,063

12 Claims. (Cl. 40—134)

This invention relates to ultraviolet illumination means, such as, for example, electrically lighted signs, and more particularly is directed to utilizing ultraviolet light for illuminated signs and display purposes and the improved construction and arrangement of parts therefor.

Among the objects of the invention is to generally improve the construction and arrangement of parts of ultraviolet, which hereinafter may be referred to as "UV," illumination devices of the character described; which parts shall be few and simple in construction and assembly to form highly efficient and attractive devices to produce illumination with "UV" light; which shall serve and have the same eye appeal as the conventional tubular type of neon sign yet capable of producing a wider range of illumination displays; which shall be relatively inexpensive to manufacture yet reliable in operation; which shall be capable of being constructed of plastic structural parts in quantity production that, where desired, are made readily demountable and interchangeable; which assembled parts are compactly and cooperatively arranged for maximum efficient operation; and which shall be practical to a high degree in use.

Other objects of the invention will in part be obvious and in part hereinafter pointed out.

The invention accordingly consists of features of constructions, combination of elements and arrangements of parts which will be exemplified in the constructions hereinafter disclosed, the scope of the application of which will be indicated in the claims following.

In the accompanying drawing in which various embodiments of the invention are shown:

Fig. 1 is a perspective view showing the front, end and top side of an improved ultraviolet illuminated sign provided with interchangeable snap-on slider letter carriers constructed to embody the invention.

Fig. 2 is a fragmentary enlarged cross-sectional view taken on line 2—2 in Fig. 1 showing partially the interior construction of the improved sign.

Fig. 3 is a perspective view showing the front, side, top and part of the rear sides of an improved interchangeable snap-on slider letter carrier removed from the assembly shown in Fig. 1.

Fig. 4 is a fragmentary front view of one modified form of said improved ultraviolet illuminated sign, partly broken away to expose the interior construction provided with interchangeable pin mounted letter carriers, the broken line rectangle designating a clear area in the filtering surface of the sign panel board.

Fig. 5 is a perspective view showing the rear, side and top sides of an improved interchangeable pin mounted letter carrier removed from the assembly shown in Fig. 3.

Fig. 5a is a perspective view showing the front, top, end and part of the rear sides of a modified form of interchangeable pin mounted letter carrier formed with a shadow box.

Fig. 6 is a fragmentary cross-sectional view taken on line 6—6 in Fig. 4 showing partially the interior and detail construction of the modified form embodying the invention.

Fig. 7 is a perspective view showing the front, top, end and part of the rear sides of an improved interchangeable snap-on slider wood or phrase carrier formed with a parallel shadow box.

Fig. 7a is a perspective view showing the front, top and end sides of a modified form of interchangeable pin mounted word or phrase carrier.

Fig. 8 is a fragmentary cross-sectional view similar to Fig. 2 showing a modified form of the invention wherein panel boards for the letter carriers are arranged on opposite sides of the light source to form a two-sided illuminated sign.

Fig. 9 is a diagrammatic view showing the utilization of a combination of standard incandescent light and ultraviolet light sources illuminating a translucent panel board or screen having ultraviolet filter portions arranged to embody the invention.

Referring in detail to the drawing, 10 denotes an improved ultraviolet illumination means in the form of a display sign provided with interchangeable snap-on slider letter carriers 11 constructed and partially assembled to embody the invention.

Said sign 10 may comprise a suitable box 12 having mounted thereon a front panel board 13 extending to serve as a complete closure. If desired, panel board 13 may be made to carry or have integrally formed therewith on the front side thereof a forwardly projecting frame trim or peripheral shadow box border 13a. Within box 12, rearwardly of front closure panel board 13, a suitable light illuminating source may be located capable of furnishing effective ultraviolet radiations, such as, spaced apart commercially obtainable tubular special phosphor or red purple type of fluorescent "UV" lamps 14 which when energized emit so-called—black light—through a blue tinted tube thereof toward and over rear surface 13b of panel board 13.

Panel board 13 may be made of thin translucent material, as for example, sheet plastic of about .010 to .030 of an inch in thickness by vacuum forming or injection molding with integral construction for readily mounting interchangeable indicia or letter carriers 11 thereon. As shown in Figs. 1 and 2, said sheet panel board 13 may be formed with parallelly aligned grooves forming undercut slideways 13c extending beyond panel rear surface 13b for receiving in detachable engagement spaced apart shoes 11a projecting rearwardly from each of said carriers 11. Said slideways 13c, as here shown, are shaped and sized with respect to shoes 11a to provide a snap-in and out mounting for carriers 11, said panel slideway construction being made sufficiently flexible and resilient to readily permit such action.

A feature in constructing said improved "UV" devices, such as, signs 10, with a composite relatively thin sheet plastic indicia or letter carrier mounting panel board 13 is that the latter may be made to serve as a "UV" filter for light radiations emitted from lamps 14 thereby reducing production cost and providing for more uniform and efficient filtering of the available "UV" radiations from said lamps 14. Thus, it is seen that the filter required for eliminating undesirable visible light, such, as provided on commercial red purple types of fluorescent lamps need not be positioned around the "UV" light source or lamp 14 which would permit only "UV" radiations to be transmitted to rear panel surface 13b, but instead a choice is provided of making any or all surface portions of panel board 13 selectively effective to serve as a filter, denoted generally as a lamina at F as in Fig. 6 to produce various lighting effects or make available such effects in combination with illumination displays from ordinary light sources.

With a suitable filtering film, that is lamina F, or lacquer applied to either panel board rear surface 13b, or a filtering substance incorporated in the plastic material forming mounting panel board 13, the choice of "UV" and ordinary illumination may be utilized selectively by locating special phosphor lamps 14 in combination with ordinary light sources and energizing them in appropriate sequence to produce the lighting display desired utilizing fluorescent, also known as luminescent, material on front side of panel board 13 in the manner hereinafter described, and shown diagrammatically in Fig. 9.

Thus, in the construction shown in Figs. 1, 2 and 3, letter carriers 11 for mounting on panel board 13 may be molded of a fluorescent material with letters 11c outlined or blocked, as for example, by having the fronts of said carriers 11 masked with a suitable opaque lacquer or stencil indicated as 11f so that only the outlined letter 11c on the front surface 11b of carrier 11 will fluoresce when activated by the "UV" source.

Plastic panel board 13 for its function as a "UV" filter may be colored, that is, tinted with a filter dye fused as an integral part of the sheet plastic in the well understood manner. Or panel board 13 may be a light colored opalescent sheet with "UV" filter forming lacquer on the rear surface 13b thereof. If desired, the filter forming lacquer may be applied to the rear surface 13b, to the front surface or to both surfaces of the opalescent panel board 13 by spraying or by any other suitable means.

Letter carriers 11 may be made of molded plastic material by extrusion like those shown in Figs. 1, 2 and 3, or by injection molding, as for example, like those shown as letter carriers 21 in Figs. 4, 5 and 6. In manufacturing extruded letter carriers 11, long lengths can be produced, cut to predetermined size and sprayed or printed as desired. The rearward facing surface 11d of letter carrier 11 may be serrated or fluted as at 11e or otherwise formed or sectionalized and the side edges 11g kept clear of masking material to produce an artistic and pleasing illuminated lighting effect and an edge glow harmonizing with the fluorescent lettering 11c on carrier front side 11b.

Since the above described sign construction is simple and light weight, it can be transported and installed, as for example, incorporated in the ceiling or side wall structure of rooms and buildings with the lamps 14 concealed and letter or equivalent decorative carriers 11 removably attached to give artistic visual illumination effects.

After providing the panel board 13 having "UV" filtering properties with slideways 13c assembled as a front side of box 12 in which is housed a suitable "UV" light source, such as, lamps 14 as described above and shown in Figs. 1 and 2, and a set or group of letter carriers 11 of fluorescent material like that shown in detail in Fig. 3, the utility of the invention will be apparent.

Upon connecting lamps 14 by means of a suitable circuit to a power source in any well known manner, not shown, and on being energized lamps 14 will emit radiations providing available "UV" light. Several lamps 14 spaced apart from each other and in close proximity to panel board 13 are utilized for uniform distribution and maximum intensity of radiation on the rear surface 13b of panel board 13 for transmission therethrough, the filtering properties of panel board 13 selectively absorbing visible light rays of predetermined frequency in the spectrum. It has been found that a filter which transmits, in addition to the "UV" rays, visible light in the blue and violet spectral range gives panel board 13 a pleasing background effect for letter carriers 11.

Letter carriers 11 are each formed, as above described, of material having the inherent property of fluorescing when activated by "UV" radiations, that is, emitting visible light in a predetermined color of a selected range so that when mounted by means of shoes 11a engaging slideways 13c in desired sequence, letter carriers 11 form an attractive display sign having the features and advantages above described, said visible light in the blue and violet spectral range transmitted by panel board 13 having been found to enhance the brilliance of the fluorescent effect and to render attractive edge glow lighting.

A modified construction of said features embodying the invention is shown in Figs. 4 and 6 as sign 20 having letter carriers 21, a front panel board 23 extending as a closure over the front side of box 22 all assembled with respect to lamps 24 as described above and shown in Figs. 1 and 2 for sign 10. Front panel 23, however, may be made of a thin plastic sheet by the well understood vacuum forming or injection molding processes with predetermined rows of depressions 23c of socket-like contour. These depressions 23c may each be sized and shaped to conform and cooperatively engage with similarly shaped pins 21a inserted therein for firmly retaining letter carriers 21 in a demountable position on the panel board 23, said pins 21a projecting from the rear side of letter carriers 21 and spaced apart to conform to the uniform spacing of said depressions 23c. In order to provide said letter carriers 21 with the pins 21a integral therewith, they may be produced by injection molding methods of the plastic material in which case instead of fluting the rear surface 21d thereof as in carrier 11, other desirable surface texture for increasing the illumination effect may be had, as for example, diamond shape design 21e, as is clear from Fig. 5.

In the construction of sign 20, panel board 23 may be provided with "UV" filtering properties in the same manner described above for panel board 13, but for the purpose of illustration is shown as a clear or translucent plastic coated on the rear side thereof with a "UV" filter lamina F, an area 20a being shown bare, that is, free from the lamina F for the purpose hereinafter described. Letter carrier 21 may be of fluorescent material with letters 21c formed by a masking lacquer 21f on front surface 21b like that described above for sign 10.

Sign 20 when assembled as shown in Figs. 4 and 6 will operate in the same manner as sign 10 described above. However, where provided with one or more clear areas 20a, sign 20 will function as described more fully below with reference to Fig. 9.

Another modified form of letter carrier 31 is shown in Fig. 5a which may be injection molded in a manner similar to carrier 21 to have spaced apart pins 31a projecting from rear surface 31d also formed with suitable light reflecting design letter 31c formed by masking lacquer or other means 31f on front side 31b and in addition may have a shadow box 31g bordering the letter, which if desired, may be lacquered or otherwise covered on the front edge 31h thereof leaving the inward facing sides 31j clear to transmit the fluorescing light rendering an additional decorative effect.

Where carriers of words or phrases are desired, such may be formed by extrusion similar to letter carrier 11 but cut in longer lengths to accommodate words, phrases, symbols or designs outlined or blocked on the front surface thereof in the fashion similar to letter 11c. Such extruded lengths may be made, as seen in Fig. 7, as word carrier 41 with front side 41b having lacquer 41f outlining lettering 41c and having a partial shadow box structure in the form of top and bottom border extensions 41h projecting forwardly in a direction opposite to shoes 41a, the latter serving to mount word carrier 41 on panel board 13 by releasable snap-in engagement in slideways 13c in the same manner as letter carrier 11.

Likewise, word, phrase, symbol or design carriers may be made by injection molding similar to letter carriers 21 and 31 but larger in size as required. Fig. 7a, for example, shows an outline cut script word carrier 51 molded of fluorescent material with pins 51a extending from the rear thereof and spaced apart to register with depressions 23c in panel board 23 for demountable assembly, as is clear from Figs. 4 and 5. Such outline cut script words may also be formed with suitable shoes instead of pins 51a for engaging slideways 13c for use with panel board 13.

Signs 10 and 20 above described show only single panel boards 13 and 23, respectively, but where desired or required, the assembly can be made two sided. To this end, for example, as shown in Fig. 8, there may be provided sign 30 having an open-ended box 32 in which lamps 24 are mounted in the same manner as described above in sign 20 and panel boards 23 form front and rear side walls enclosing lamps 24. Letter carriers 21 may be detachably secured to either or both panel boards 23 and are in proper position to receive the "UV" radiation in the same manner as described above for signs 10 and 20.

As pointed out above and referring to Fig. 9, it is contemplated in practicing the invention to utilize both "UV" and ordinary sources of illumination, such as, tubes 64 and bulbs 64a, respectively, emitting "UV" and visible light radiation against rear side of panel board 60 which is formed with clear areas 60a and "UV" filtering surface 63b by any suitable method, such as, composite fabrication or by coating one or both sides like panel board 23 shown in Fig. 6 as coated on the rear side with filtering lamina F. Thus, special effects may be obtained by arranging a display of fluorescent words, designs or symbols as desired against either the clear areas 60a or "UV" filtering surfaces 63b as background and flashing tubes 64 and bulbs 64a in a desired predetermined sequence, as for example, alternatingly flashing tubes 64 and bulbs 64a, maintaining tubes 64 lighted constantly and flashing bulbs 64a, and maintaining bulbs 64a lighted constantly while flashing tubes 64.

Whereas, letter carriers 11, 21, 31, word carrier 41 and outline cut carrier 51 are all shown molded of a plastic material having fluorescent properties. It is to be understood that in practicing the invention, such letter and word carriers may be molded of any translucent plastic material on which a fluorescent lacquer or paint is applied as a translucent coating in which case the masking coatings 11f, 31f and 41f may be omitted and the fluorescent lacquer or paint applied in the form of the letters 11c, 21c, 31c or words 41c.

The term "molded plastic" as used in the claims following is to be interpreted in a generic sense to include extruded vacuum formed and injection molded pieces.

It is thus seen that there is provided improved illuminated sign and display constructions utilizing ultraviolet light in which the several objects of the invention are achieved and which are well adapted to meet conditions of practical use.

As various possible embodiments might be made in the above invention, and as various changes might be made in the devices above set forth, it is to be understood that all the matters herein set forth or shown in the accompanying drawings are to be interpreted as illustrative and not in a limiting sense.

Having thus described my invention, I claim as new and desire to secure by Letters Patent:

1. An electrically operated display device comprising a molded plastic sheet material panel board having "UV" filtering properties, an indicia carrier detachably mounted on a front of said panel board, and an unfiltered "UV" radiation source spaced from a rear side of said panel board arranged to supply said unfiltered "UV" radiation in substantially uniform intensity to said panel board rear side for conversion into filtered "UV" radiation on passing through the panel board, said indicia carrier being translucent and having fluorescent properties capable of excitation to visibility by said filtered "UV" radiation passing through the panel board, said panel board and carrier each having an integrally formed element of a separable interlocking means forming said detachable mounting.

2. The electrically operated display device defined in claim 1 in which said panel board filtering properties are provided by a lamina extending over at least one surface of the sheet material.

3. The electrically operated display device defined in claim 1 in which said panel board filtering properties are provided as a dye dispersed through the molded plastic sheet material.

4. The electrically operated display device defined in claim 1 in which said panel board filtering properties include the transmission of visible light in the blue and violet spectral range.

5. An electrically operated display device comprising a molded plastic sheet material panel board mounted as a facing structure in close proximity to a "UV" light source arranged as a bank of tubular lamps spaced from each other and from said panel board for providing the latter with radiation of optimum and substantially uniform intensity, said panel board having "UV" filtering properties and being formed with multiple uniformly spaced sockets depressed from a front side thereof, carriers having rearwardly projecting means seated in said sockets detachably securing each carrier to the front side of said panel board, each of said carriers being formed with translucent indicia having fluorescent properties for glowing when activated by the "UV" radiation transmitted from said source through the panel board, a rear surface of each of said carriers being formed with light dispersing means for intensifying the glow.

6. An electrically operated sign comprising a translucent display panel board having "UV" radiation filtering areas and clear areas, a first indicia carrier of translucent plastic material having fluorescent properties detachably mounted to a front surface of the panel board on said filtering areas with a rear facing portion of the carrier positioned to receive "UV" radiations directed thereto from said panel board, a second indicia carrier detachably mounted to a front surface of the panel board on said clear areas positioned to receive visible light radiation directed thereto from said panel board, and a "UV" and visible light radiation source positioned in close proximity to the rear side of said panel board constructed and arranged to supply "UV" and visible light radiation to said panel board rear side for transmittal to the carriers overlying said clear areas and for conversion into filtered "UV" radiation on passing through said filtering area to excite the fluorescent properties of said first indicia carriers.

7. In a "UV" radiation filtering device of the character described, an indicia carrier formed of molded translucent plastic material having fluorescent means dispersed therethrough, integrally formed means extending from a rear side of said carrier for detachably mounting on a display panel board furnishing "UV" radiation for activating said fluorescent means, said rear side being formed with light dispersing means, and a masking means on a front side of said carrier outlining the indicia as fluorescent light transmitted through the plastic material on activation by "UV" radiation supplied by the panel board.

8. The "UV" radiation filtering device defined in claim 7 in which the indica carrier is molded with a peripheral shadow box extending from the front side for framing the indicia.

9. An electrically operated display device comprising an open front and rear faced box mounting an unfiltered "UV" radiation source, molded plastic sheet material panel boards having "UV" filtering properties mounted on the front and rear faces of the box in close proximity to said "UV" radiation in substantially uniform intensity for conversion into filtered "UV" radiation, indicia carriers molded of a translucent plastic material having fluorescent properties detachably mounted on an outwardly facing surface of each of said panel boards to receive filtered "UV" radiations from said source transmitted through the panel boards.

10. In a "UV" radiation filtering device, an indicia carrier formed of molded translucent plastic material having fluorescent properties when exposed to "UV" radiation, passing from a rear facing portion to a front facing surface portion thereof, said rear facing portion of said carrier being formed for detachably mounting on a display panel board furnishing "UV" radiation directed to said carrier rear facing portion, said carrier rear facing portion having a light dispersion surface for a glow lighting effect, and a masking means on said front facing surface portion outlining an indicia as fluorescent light transmitted through the plastic material on activation by "UV" radiation supplied to said rear facing portion.

11. The electrically operated sign defined in claim 6 in which said clear areas transmit light of predetermined color in the visible range.

12. An electrically operated display device comprising a molded plastic sheet material panel board having "UV" filtering properties, an indicia carrier detachably mounted on a front of said panel board, and an unfiltered "UV" radiation source spaced from a rear side of said panel board arranged to supply said unfiltered "UV" radiation in substantially uniform intensity to said panel board rear side for conversion into filtered "UV" radiation on passing through the panel board, said indicia carrier being translucent and having fluorescent properties capable of excitation to visibility by said filtered "UV" radiation passing through the panel board.

References Cited in the file of this patent

UNITED STATES PATENTS

| | | |
|---|---|---|
| 1,163,750 | Grant | Dec. 14, 1915 |
| 1,229,527 | Rundle | June 12, 1917 |
| 1,455,474 | Brown | May 15, 1923 |
| 1,592,393 | Sulzberger | July 13, 1926 |
| 1,813,491 | Gillard | July 7, 1931 |
| 1,826,389 | Fullerton | Oct. 6, 1931 |
| 1,871,650 | Bartley | Aug. 16, 1932 |
| 2,015,170 | Ward | Sept. 24, 1935 |
| 2,094,436 | Van Deventer et al. | Sept. 28, 1937 |
| 2,305,082 | Hocott | Dec. 15, 1942 |
| 2,395,197 | Schlanger | Feb. 19, 1946 |
| 2,521,571 | Du Mont | Sept. 5, 1950 |
| 2,588,183 | Vigon | Mar. 4, 1952 |
| 2,594,903 | Freeman | Apr. 29, 1952 |
| 2,653,109 | Switzer | Sept. 22, 1953 |
| 2,699,620 | Smythe | Jan. 18, 1955 |

OTHER REFERENCES

Modern Plastics, October 1948, pages 88 to 91 relied on.